United States Patent

Thompson et al.

[15] 3,688,741
[45] Sept. 5, 1972

[54] PORTABLE ANIMAL TOILET

[72] Inventors: Sam W. Thompson; Roy B. Hollingsworth, both of Box 329, Jefferson City, Tenn. 37760

[22] Filed: April 6, 1970

[21] Appl. No.: 25,822

[52] U.S. Cl. .................................................119/1
[51] Int. Cl. ............................................A01k 29/00
[58] Field of Search.................................119/1, 15

[56] References Cited

UNITED STATES PATENTS

| | | | |
|---|---|---|---|
| 3,476,083 | 11/1969 | Vanderwall | 119/1 |
| 3,111,932 | 11/1963 | Knutson | 119/1 |
| 2,741,223 | 4/1956 | Winborn, Jr. | 119/1 |
| 2,306,014 | 12/1942 | Carson | 119/1 |
| 2,390,854 | 12/1945 | Thompson | 119/15 |

*Primary Examiner*—Hugh R. Chamblee
*Attorney*—Francis G. Cole

[57] ABSTRACT

A portable toilet device or commode for cats and other animals having, or capable of acquiring, tidy habits in disposing of their bodily waste material, i.e. feces and urine. The device comprises two separable elements, the first an outer box-shaped housing, having at least one open lateral side and a centrally disposed opening in its upper face, and the second a container of less dimensions than the housing for reception within the housing. The container is open at its top, and when inserted through the open side of the housing is supported directly beneath the opening in the upper face of the housing to receive matter discharged through the opening. The housing opening is generally circular, having at opposite sides elongated slots through which the animal may insert a paw to cover the discharge matter with absorbent material or litter previously distributed on the bottom of the container.

1 Claim, 4 Drawing Figures

PATENTED SEP 5 1972 3,688,741
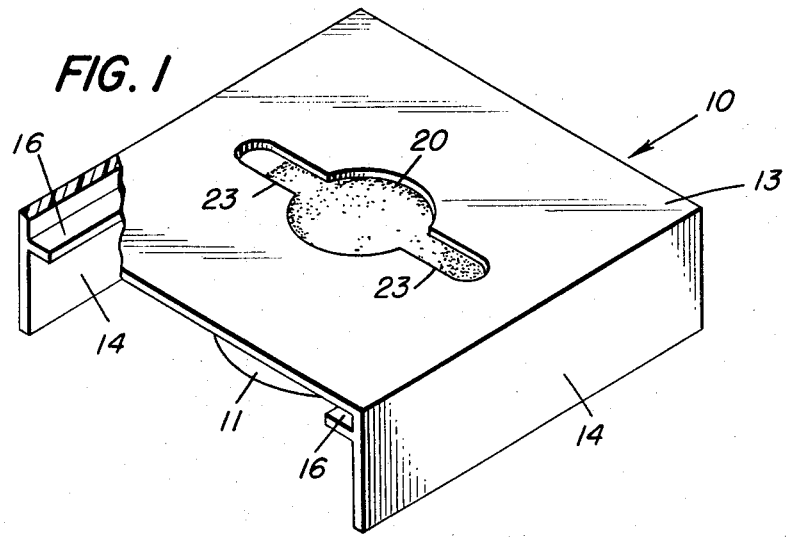
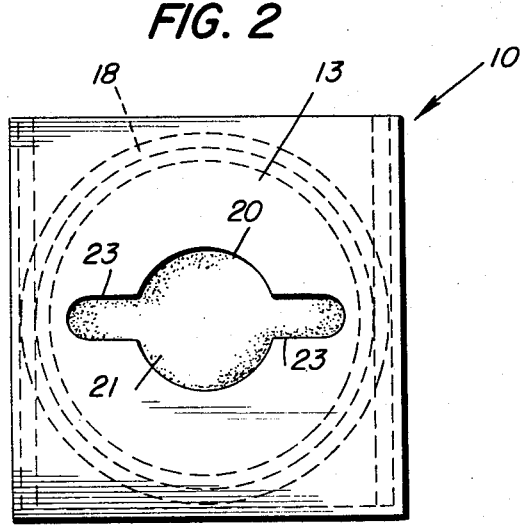
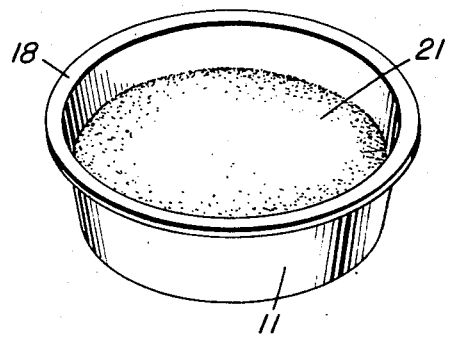
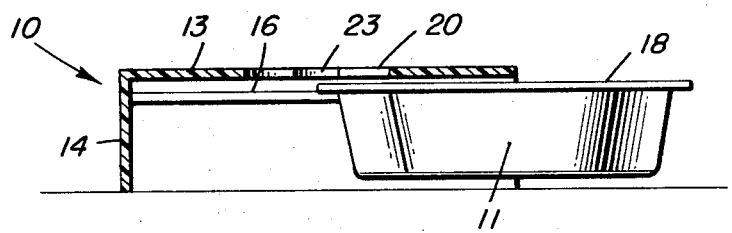
INVENTORS
Sam W. Thompson
Roy B. Hollingsworth
BY Francis J. Cole
ATTORNEY 3,688,741

PORTABLE ANIMAL TOILET

SUMMARY OF THE INVENTION

The present invention relates to a device useful in the care of household pets, such as cats, to aid in neat disposal of bodily waste material. It comprises two separable elements, a housing, and a container for discharged material. The housing may be generally rectangular, open at one side to permit insertion and withdrawal of the container, and is provided with means interengaging with the container whereby the latter is supported by and within the housing.

The container is pan-shaped, i.e., open at its upper side, and is supplied prior to insertion in the housing with a layer of loose material, such as and, dirt, litter, or granular absorbent material. An opening in the top wall of the housing overlies the inserted container, and the dimensions of the housing are preferably sufficient to permit a cat or other animal to squat on the top wall or platform of the housing and to defecate or urinate through the opening and into the container below.

Cats instinctively cover their waste material when deposited on dirt or the like by pawing or scratching the dirt, and can be encouraged to effect discharge in a selected area indoors where dirt or litter is provided. However, when the dirt or litter is inadequately confined, pawing serves to scatter it, requiring a more or less extensive cleaning operation. On the other hand, confinement which is too complete tends to circumscribe the animal's normal activity and discourages the animal from completely satisfying its instinct to cover the waste material.

It is, therefore, an object of the invention to provide a device for the reception of animal waste material which is supplied with dirt or litter to enable the animal to cover the waste deposit, and which effectively prevents scattering while allowing full freedom of action to satisfy the covering instinct.

More specifically, it is an object of the invention to provide a simple two-element structure comprising a housing having an opening in the upper face thereof through which waste material may be discharged, and an open container removably supported by and within the housing for receiving the material so discharged. The opening in the housing is preferably sufficiently small to prevent scattering during the subsequent covering operation, and pawing to effect covering is facilitated by the provision in the housing of one or more elongated slots communicating with the opening, through which the animal's paw can be inserted and manipulated to achieve without difficulty the instinctive covering operation. When a device of this kind is properly constructed and dimensioned, it is found, surprisingly, that cats do not require training to use it, presumably because of its complete adaptation to the needs and instincts of the animal.

While the device is readily portable, and is normally seated on the floor or ground wherever convenient, the housing may, if desired, be secured in a selected location. The container, being supported within and above the lower portion of the housing, may readily be withdrawn for emptying and cleaning without disturbing or displacing the housing.

Other objects and advantages of the invention will be evident from the following detailed description when read in conjunction with the accompanying drawings illustrative of the invention.

BRIEF DESCRIPTION OF THE DRAWINGS

FIG. 1 is a view in perspective of a device embodying the invention, with a fragment of the housing top broken away.

FIG. 2 is a plan view of the device.

FIG. 3 is a perspective view of the container, removed from the housing; and

FIG. 4 is a vertical section through the housing, with the container partly inserted therein.

DESCRIPTION OF THE PREFERRED EMBODIMENT

Referring to the drawings in detail, the preferred form of device comprises two elements, a housing 10 and a container 11. As shown, housing 10 is preferably rectangular in outline, having an upper wall or platform 13 and three side walls 14. The fourth side of the housing is open to permit the insertion of the container 11, and the housing is open at the bottom to allow easy access to the interior of the housing for cleaning and sterilizing. The housing may be formed of any suitable material, for instance wood, metal or plastic. If of wood, the side walls 14 may be rabbetted just below the platform 13; if of metal or plastic, a bead or lip 16 extending inwardly from each side wall is formed for the purpose of supporting the container within the housing. A plastic housing is preferred.

The container 11 is pan-shaped, being open at the top and having at its upper edge a peripheral flange 18 adapted to seat on bead or lip 16, or within the rabbet if the housing be formed of wood, to support the container within the housing. Preferably the container is of metal or plastic for easy cleaning and is circular in contour. The depth of the container is such as to clear the floor or other support on which the housing rests, to facilitate insertion and withdrawal of the container. This also permits securing of the housing to the floor or other support, if desired.

The top wall or platform 13 of the housing is provided with a centrally disposed opening 20, preferably circular, and of sufficient size to permit discharge therethrough of bodily waste of the animal, but small enough to prevent or minimize scattering during the subsequent covering operation. To permit the animal freedom to paw the loose sand, dirt or litter 21 initially placed in container 11, one or more elongated slots 23, communicating with the opening 20, are formed in the top wall or platform 13.

In use, the container 11 is supplied with a layer of absorbent material 21 and is inserted in housing 10 where it is supported immediately beneath top wall or platform 13. The platform 13 is sufficiently large to permit the cat or other animal to squat on it while depositing its bodily waste through opening 20 into container 11. Responding to natural instinct, the animal then covers its waste by pawing the absorbent material 21, being aided in this operation by slots 23 through which its paw can be extended. Because of the small size of opening 20, scattering is effectively prevented and a deck or platform on which the animal can readily crouch is provided without increasing the overall dimensions of the housing.

What is claimed is:

1. A portable animal toilet facility consisting of two members only, and comprising, in combination, an open topped container initially supplied with a layer of absorbent material on which the bodily waste of a cat or like animal may be deposited, and a housing for said container of generally boxlike configuration on which the cat may squat, said housing having a top wall open at all sides for easy access by the animal and having with a centrally disposed opening communicating directly with the open top of said container through which waste material may be discharged directly into said container, and having an open side through which said container may be inserted laterally into said housing, and coacting guide means on said housing and container being provided with coacting guide means on which the container is slidable into and out of said housing, said guide means supporting said container within said housing and directly beneath said top wall to receive bodily waste discharged through said opening, said container being supported solely by said coacting guide means with its bottom above the base of said housing to permit easy lateral insertion and withdrawal of said container for emptying and cleaning, emptying said centrally disposed opening in said top wall of said housing being generally circular, said top wall being further provided with at least one elongated slot communicating with said central opening and of sufficient width and length to permit the paw of the animal to extend therethrough and to facilitate pawing of the absorbent material by the animal subsequent to discharge of its waste material.

* * * * *